Figure 1:
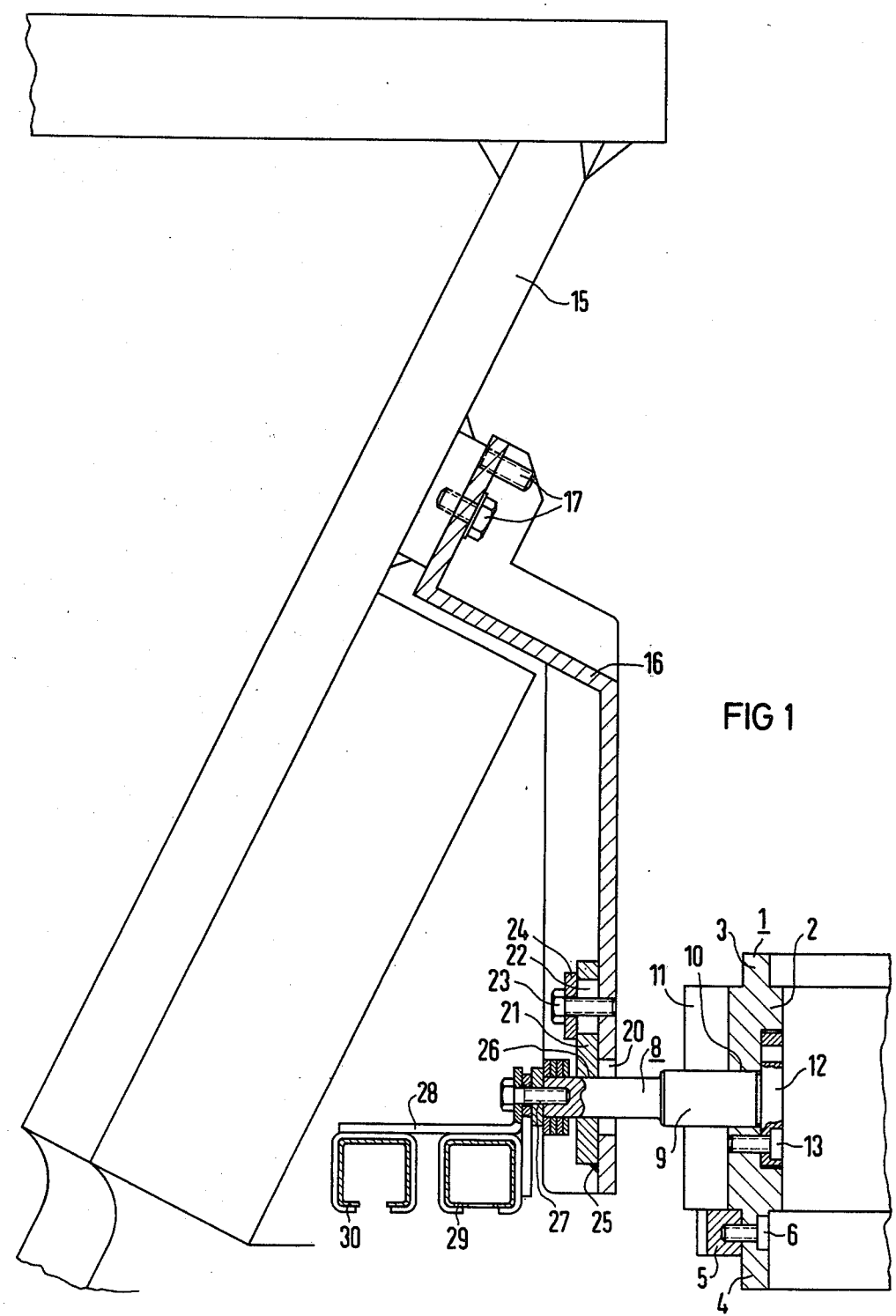

United States Patent [19]

Weber et al.

[11] 4,299,656
[45] Nov. 10, 1981

[54] INSPECTION AND TESTING DEVICE

[75] Inventors: Robert Weber, Uttenreuth; Johannes Gallwas, Erlangen, both of Fed. Rep. of Germany

[73] Assignee: Kraftwerk Union Aktiengesellschaft, Mülheim, Fed. Rep. of Germany

[21] Appl. No.: 62,068

[22] Filed: Jul. 30, 1979

[30] Foreign Application Priority Data

Aug. 1, 1978 [DE] Fed. Rep. of Germany ....... 2833763

[51] Int. Cl.³ ............................................. G21C 17/00
[52] U.S. Cl. .................................................. 376/249
[58] Field of Search ............... 176/19 R; 73/598, 600, 73/619, 622, 640

[56] References Cited

U.S. PATENT DOCUMENTS 3,930,942  1/1976  Thome .............................. 176/19 R

FOREIGN PATENT DOCUMENTS 2609541  9/1977  Fed. Rep. of Germany .... 176/19 R
2620715  11/1977  Fed. Rep. of Germany .... 176/19 R

*Primary Examiner*—S. A. Cangialosi
*Attorney, Agent, or Firm*—Herbert L. Lerner

[57] ABSTRACT

Device for inspecting and testing the bottom of a cylindrical reactor pressure vessel having a circular track disposed in vicinity of the bottom of the pressure vessel, including a plurality of strut members, means for connecting the strut members to the bottom of a pressure vessel, a plurality of pins extending radially outwardly from the circular track and supported in the strut members.

5 Claims, 3 Drawing Figures

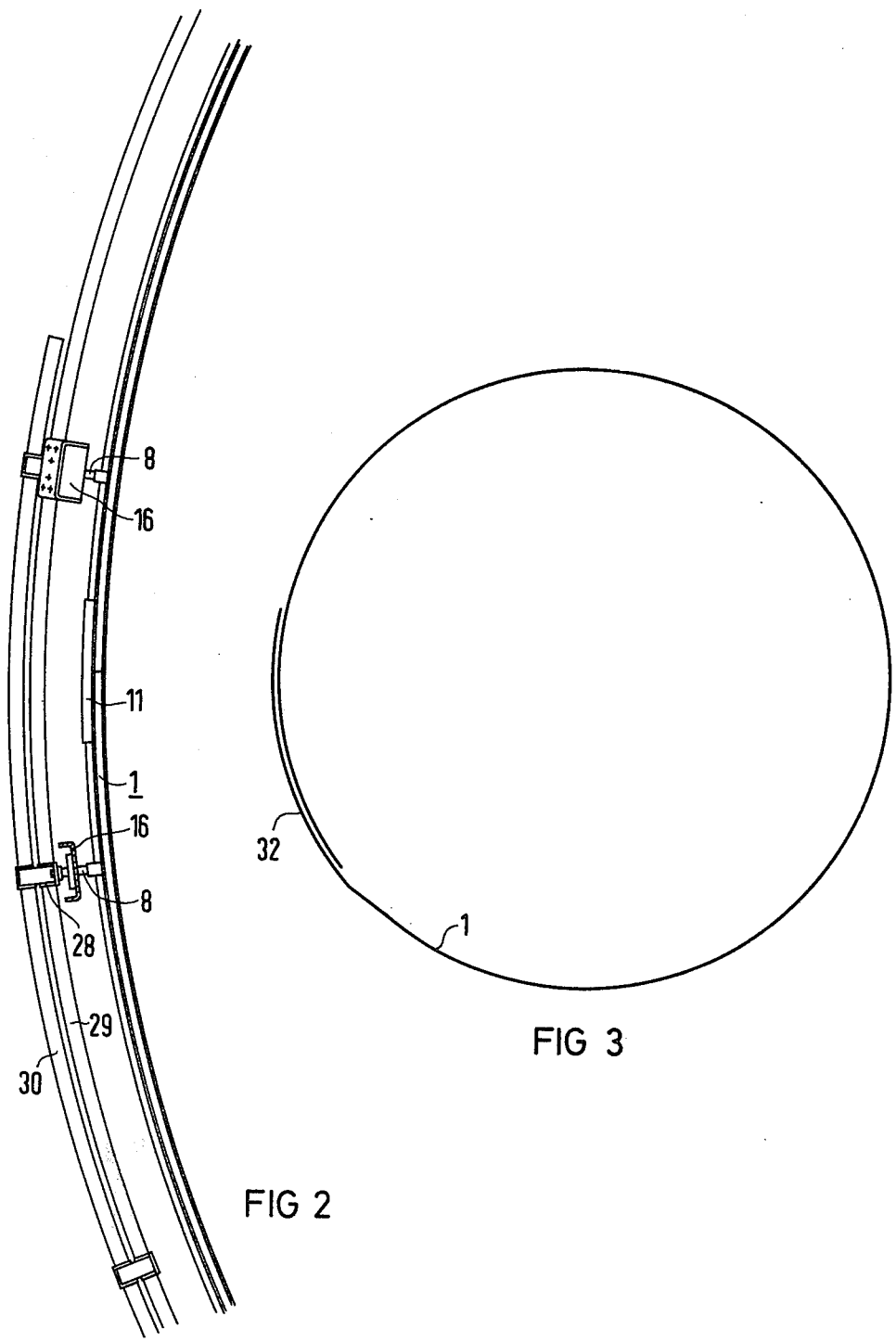

INSPECTION AND TESTING DEVICE

The invention relates to an inspection and testing device for the bottom of a cylindrical reactor pressure vessel with a circular track disposed in vicinity of the bottom of a cylindrical reactor pressure vessel.

In an inspection device known heretofore from U.S. Pat. No. 3,930,942, the track is fastened to a part of the reactor building which is located below the bottom of the reactor pressure vessel. A carriage travels on this track and, in turn, carries a track for a television camera which can thereby be adjustable on diameters of the bottom of the reactor pressure vessel which is circular in cross section. The relationship between the television camera and the bottom naturally need not be very exact because the field of view of the camera is adequately large and the distance between the camera and the bottom of the pressure vessel is immaterial from a practical standpoint.

It is different, however, if a track is thus to be used, for example, for ultrasonic tests which must be repeated at given time intervals. In such a case, accurate reproducibility of the relative positions of the bottom of the pressure vessel and the measuring device guided by the track is important, including, especially, the centered disposition of the track with respect to the axis of the cylindrical reactor pressure vessel.

It is accordingly an object of the invention to provide an inspection and testing device which meets the foregoing requirements.

With the foregoing and other objects in view, there is provided, in accordance with the invention, a device for inspecting and testing the bottom of a cylindrical reactor pressure vessel having a circular track disposed in vicinity of the bottom of the pressure vessel, comprising a plurality of strut members, means for connecting the strut members to the bottom of a pressure vessel, a plurality of pins extending radially outwardly from i.e. from the outside of, the circular track and supported in the strut members. The hereinaforementioned centered disposition can thus be maintained, even though the track is subjected, during operation i.e. while the reactor is being heated up, to large and, particularly, varying thermal expansions which, in addition, may be subjected to influences other than the thermal expansions of the reactor pressure vessel.

With the invention, the pins can shift in longitudinal direction thereof in the strut members, so that the centered disposition and the circular shape of the track are maintained even during thermal expansions. The same "mobility" or shifting is naturally provided also for cooling, so that the expression "thermal expansions" is meant also to include negative values.

In accordance with another feature of the invention, a guide plate is adjustably fastened to the strut members, respectively, the pins, respectively, being seated in the guide plate. This is of advantage because, after the reactor pressure vessel has been installed, the track can thereby be aligned exactly without great expense. The setting of the guide plate on the strut member can then be fixed, in fact, by a weld connection, for example. In accordance with a further feature of the invention, the thickness of the guide plate is preferably smaller than the diameter of the pin, respectively.

In accordance with an added feature of the invention, on the side of the strut member facing away from the track, the pins are connected to a cable guide. With this cable guide, the test device traveling on the track can be supplied with power through cables. In addition, the measurement data are conducted through such cables to a monitoring device disposed so as to be protected from radiation without having the cables impede the movement of the inspection and testing device. In accordance with a concomitant feature of the invention, at least two of the pins are located mutually adjacent, and two mutually adjacent parts of a spirally overlapping cable guide are fastened thereto. With the spirally overlapping parts of the cable guide, space is thus provided for rectifing the cable or cables in the end position.

Other features which are considered as characteristic for the invention are set forth in the appended claims.

Although the invention is illustrated and described herein as embodied in an inspection and testing device, it is nevertheless not intended to be limited to the details shown, since various modification and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is a vertical sectional view of the inspection and testing device according to the invention showing the means for fastening the track to a strut member, FIG. 2 is a fragmentary plan view of the track and other structural features associated therewith; and FIG. 3 is a diagrammatic plan view of the spirally overlapping cable guide forming part of the inspection and testing device.

Referring now to the drawing and first, particularly, to FIG. 1 thereof, there is shown a track 1 which extends around the bottom of an otherwise non-illustrated cylindrical pressure vessel for a nuclear reactor. The track 1 has a substantially rectangular profile 2, as shown, with likewise rectangular centered projections 3 and 4 at both narrow sides thereof. A rack 5 is fastened by a screw 6 to the projection 4, which ensures an exactly adjustable feed of a non-illustrated carriage provided with a test device for ultrasonic testing.

The exactly circular track is fastened by cylindrical pins 8, which, for example, are distributed with an angular or circumferential spacing of 15°, radially extending toward the center of the track circle. The pins 8 are seated with an enlarged shoulder or collar 9 in a bore 10 formed in the part 2 of the track 1. Since the track 1 is assembled from several subsections, straps 11 are provided which are bolted and pinned at the joints thereof. The thickness of the respective joints, however, is smaller than the length of the shoulder or collar 9 which is secured in the bore 10 by fastening a flange part 12 thereof by means of screws 13 to the track part 2.

To fasten the track 1 in a defined position relative to the non-illustrated bottom of the reactor pressure vessel, a support skirt 15 is provided, which is seated as a conical jacket at the lower end of the reactor pressure vessel. An angularly disposed strut member 16 is fastened to the support skirt 15 by means of screws 17. The strut member 16 has a T-shaped profile or section providing it with great strength or rigidity. In vicinity of the pin 8, a hole 20 of about twice the diameter of the pin 8 is provided in the strut member 16. The pin 8 is therefore held in a guide plate 21 which is, in turn, adjustable relative to the strut member 16 by means of a hole 22 through which a fastening screw 23 extends. Thus, the track 1 can be adjusted accurately with respect to the bottom of the reactor pressure vessel by moving the guide plate 21. The screw 23 is then tightened, so that the plate 21 is fastened by a clamping member 24. For additional safety, a welded seam 25 is applied.

As is apparaent, the section of the pin 8 extending through a bore 26 with slight clearance is longer than the thickness of the guide plate 21. Therefore, the track 1 can expand freely in radial direction wherein the pin 8 extends. In addition, the slight thickness of the guide plate 21, which is less than the diameter of the pin 8, prevents the pin 8 from getting jammed in the guide plate 21.

A tapped bore 27 is provided in the end face of the pin 8. An angle 28 is screwed on thereat and carries two identical cable guides 29 and 30 which are disposed mutually adjacent. The adjacent cable guides 29 and 30 form part of a spirally overlapping section 32 (FIG. 3), which enables a non-illustrated carriage traveling on the track 1 to traverse the entire circle of the track 1 seen in FIG. 3 without having to transport the cables in the end position from the proximity of this circle.

We claim:

1. Device for inspecting and testing the bottom of a cylindrical pressure vessel having a circular track disposed in vicinity of the bottom of the pressure vessel and secured coaxially to the pressure vessel, comprising a plurality of strut members, means for connecting said strut members to the bottom of a pressure vessel, and a plurality of pins extending in a direction radial to the center of the circular track and supported in said strut members, said pins being fixed in said strut members against movement in a direction transverse to said pins, said pins being freely shiftable in said direction radial to the center of said circular track.

2. Device according to claim 1 including a guide plate adjustably fastened to said strut members, respectively, said pins, respectively, being seated in said guide plate.

3. Device according to claim 2 wherein said guide has a thickness smaller than the diameter of the respective pins.

4. Device according to claim 1 wherein said pins have a respective first end thereof secured in said track on a side of the respective strut members facing towards the track, and a respective second end thereof extending from the respective strut members at a side thereof facing away from the track, and including a cable guide connected to said second end of said pins, respectively, at said side of said strut members, respectively, facing away from the track.

5. Device according to claim 4 wherein at least two of said pins are located mutually adjacent, and said cable guide is spirally overlapping and has two mutually adjacent overlapping parts fastened to said mutually adjacent pins.

* * * * *